United States Patent
Islam (10) Patent No.: US 9,964,727 B2
(45) Date of Patent: May 8, 2018

(54) ASSEMBLY FOR DISTRIBUTING TRUNK CABLE TO FURCATED CABLE WITH A BOSSED SPACER HAVING LEGS

(71) Applicant: CommScope Technologies LLC, Hickory, NC (US)

(72) Inventor: Nahid Islam, Westmont, IL (US)

(73) Assignee: CommScope Technologies LLC, Hickory, NC (US)

( * ) Notice: Subject to any disclaimer, the term of this patent is extended or adjusted under 35 U.S.C. 154(b) by 0 days. days.

(21) Appl. No.: 15/465,225

(22) Filed: Mar. 21, 2017

(65) Prior Publication Data
US 2017/0276884 A1  Sep. 28, 2017

Related U.S. Application Data (60) Provisional application No. 62/312,315, filed on Mar. 23, 2016.

(51) Int. Cl.
*G02B 6/44* (2006.01)

(52) U.S. Cl.
CPC .................. *G02B 6/4471* (2013.01)

(58) Field of Classification Search
CPC .. G02B 6/3885; G02B 6/3857; G02B 6/3881; G02B 6/443; G02B 6/38; G02B 6/44
See application file for complete search history.

(56) References Cited

U.S. PATENT DOCUMENTS

| | | | |
|---|---|---|---|
| 4,707,566 A | 11/1987 | Titcombe et al. | |
| 9,465,183 B2 * | 10/2016 | Islam | H02G 15/1055 |
| 2010/0104253 A1 | 4/2010 | Momotsu et al. | |
| 2011/0091169 A1 | 4/2011 | Van Der Meulen et al. | |
| 2014/0140671 A1 | 5/2014 | Islam | |

FOREIGN PATENT DOCUMENTS

CN   202533632 U   11/2012

OTHER PUBLICATIONS

Notification of Transmittal of the International Search Report and the Written Opinion of the International Searching Authority, or the Declaration corresponding to International Application No. PCT/US2017/022507, dated May 31, 2017.

* cited by examiner

*Primary Examiner* — Andrew Jordan
(74) *Attorney, Agent, or Firm* — Myers Bigel, P.A.

(57) ABSTRACT

A cable distribution assembly includes: a housing having a first side and a second side, wherein a plurality of bores extend through the housing from the first side to the second side; a plurality of furcation tubes inserted into the bores at the second side of the housing; a trunk cable comprising a jacket and a plurality of optical fibers, wherein one or more of the optical fibers are threaded through the bores and into the furcation tubes; a spacer adjacent the first side of the housing and the cable jacket, the spacer creating space in which the optical fibers are routed from the trunk cable to the bores at the first side of the housing; and a cover that covers the spacer and at least partially covers the trunk cable and the first side of the housing.

18 Claims, 8 Drawing Sheets

ASSEMBLY FOR DISTRIBUTING TRUNK CABLE TO FURCATED CABLE WITH A BOSSED SPACER HAVING LEGS

RELATED APPLICATION

The present application claims priority from and the benefit of U.S. Provisional Patent Application No. 62/312,315, filed Mar. 23, 2016, the disclosure of which is hereby incorporated herein in its entirety.

FIELD OF THE INVENTION

The present invention relates generally to power and signal distribution, and more particularly to distribution from trunk cables to furcated cables.

BACKGROUND

Latest developments in technology for delivering power and data in wireless infrastructure use hybrid cables, wherein the term "hybrid cable" refers to a cable that includes both power conductors and one or more fiber optic cords or cables. An exemplary hybrid cable is the HFF cable, available from CommScope, Inc. (Joliet, Ill.). Unlike RF-based systems, a single hybrid trunk cable can be used to power multiple sectors, thereby eliminating multiple runs of RF cable. However, in order to use a single hybrid trunk cable, at some point the trunk cable must transition to jumper cables. Typically, these are distributed inside an enclosure that transitions the trunk conductor gauge to the jumper conductor gauge and connects the optical fibers in the trunk to the optical fibers in the jumper cables. Currently, transitions are achieved by making connections inside the enclosure, requiring it to be opened, cables to be fed/mated to the enclosure, and power and fiber connections to be made, all in the field (e.g., on the top of cell sites near a remote radio unit (RRU)). This practice can create many issues for installers, including time, safety, connection errors (such as loose power connections and/or poor fiber cleaning), and more opportunity for connector damage.

SUMMARY

As a first aspect, embodiments of the invention are directed to a cable distribution assembly, comprising: a housing having a first side and a second side, wherein a plurality of bores extend through the housing from the first side to the second side; a plurality of furcation tubes inserted into the bores at the second side of the housing; a trunk cable comprising a jacket and a plurality of optical fibers, wherein one or more of the optical fibers are threaded through the bores and into the furcation tubes; a spacer adjacent the first side of the housing and the cable jacket, the spacer creating space in which the optical fibers are routed from the trunk cable to the bores at the first side of the housing; and a cover that covers the spacer and at least partially covers the trunk cable and the first side of the housing.

As a second aspect, embodiments of the invention are directed to a cable distribution assembly, comprising: a housing having a first side and a second side, wherein a plurality of bores extend through the housing from the first side to the second side; a plurality of armored furcation tubes inserted into the bores at the second side of the housing; a trunk cable comprising a jacket and a plurality of optical fibers, wherein one or more of the optical fibers are threaded through the bores and into the furcation tubes; a spacer adjacent the first side of the housing and the cable jacket, the spacer creating space in which the optical fibers are routed from the trunk cable to the bores at the first side of the housing; and a cover that covers the spacer and at least partially covers the trunk cable and the first side of the housing, wherein in the cover comprises a ferrule and a heat-shrink tube overlying the ferrule.

As a third aspect, embodiments of the invention are directed to a method of forming a cable distribution, comprising the steps of:
 (a) inserting a plurality of optical fibers of a trunk cable through a spacer;
 (b) inserting the plurality of optical fibers into bores in a first side of a housing;
 (b) inserting the plurality of optical fibers into a plurality of furcation tubes;
 (c) inserting the plurality of furcation tubes into the bores in a second side of the housing;
 (e) positioning the spacer adjacent the first side of the housing; and
 (f) applying a cover that at least partially covers the cable and the housing and covers the spacer.

DETAILED DESCRIPTION

The present invention is described with reference to the accompanying drawings, in which certain embodiments of the invention are shown. This invention may, however, be embodied in many different forms and should not be construed as limited to the embodiments that are pictured and described herein; rather, these embodiments are provided so that this disclosure will be thorough and complete, and will fully convey the scope of the invention to those skilled in the art. It will also be appreciated that the embodiments disclosed herein can be combined in any way and/or combination to provide many additional embodiments.

Unless otherwise defined, all technical and scientific terms that are used in this disclosure have the same meaning as commonly understood by one of ordinary skill in the art to which this invention belongs. The terminology used in the below description is for the purpose of describing particular embodiments only and is not intended to be limiting of the invention. As used in this disclosure, the singular forms "a", "an" and "the" are intended to include the plural forms as well, unless the context clearly indicates otherwise. It will also be understood that when an element (e.g., an assembly, circuit, cable, housing, etc.) is referred to as being "connected" or "coupled" to another element, it can be directly connected or coupled to the other element or intervening elements may be present. In contrast, when an element is referred to as being "directly connected" or "directly coupled" to another element, there are no intervening elements present.

Figure 1:
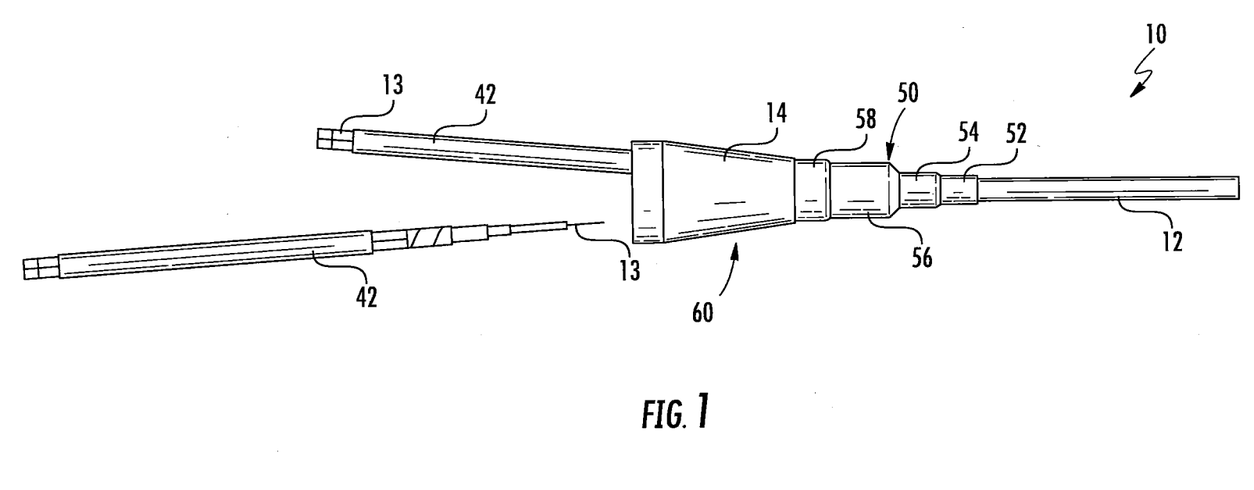
FIG. 1 is a side view of an assembly for distributing trunk cable to furcated cable according to embodiments of the invention, with a fiber optic trunk cable entering one end of the assembly and two furcated cables (one of which is exploded in the illustrated view) exiting the other end of the assembly.
Figure 2:
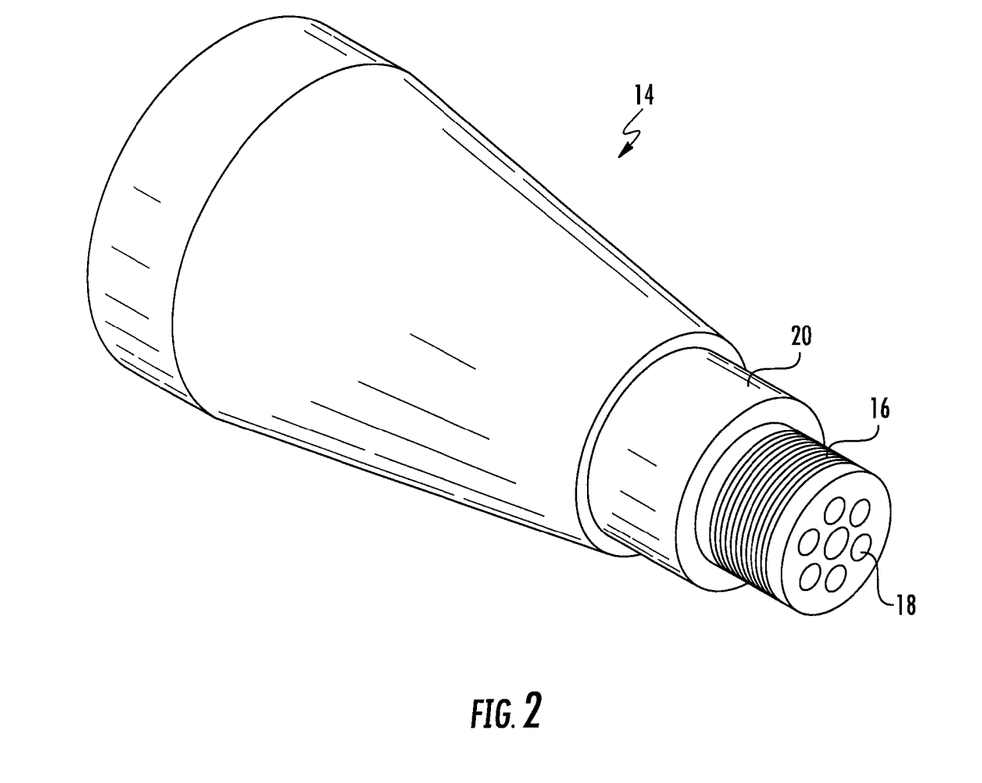
FIG. 2 is a perspective view of the housing of the assembly of FIG. 1.
Figure 3:
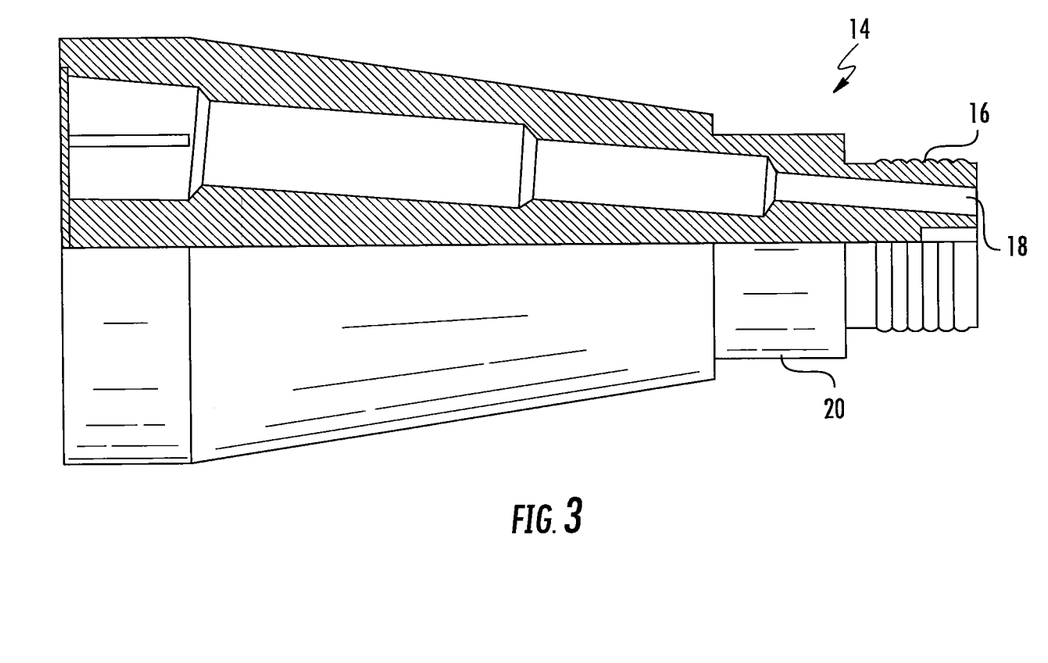
FIG. 3 is a side section view of the housing of FIG. 2.
Figure 4:
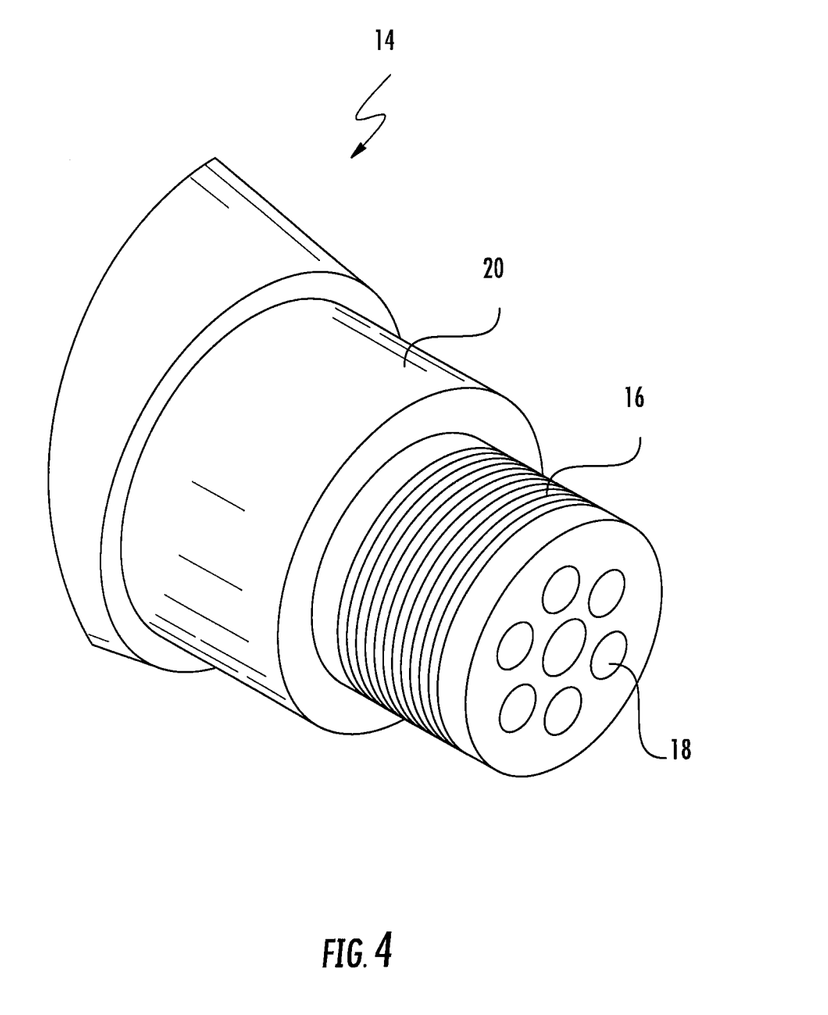
FIG. 4 is an enlarged partial perspective view of the neck end of the housing of FIG. 2.
Figure 5:
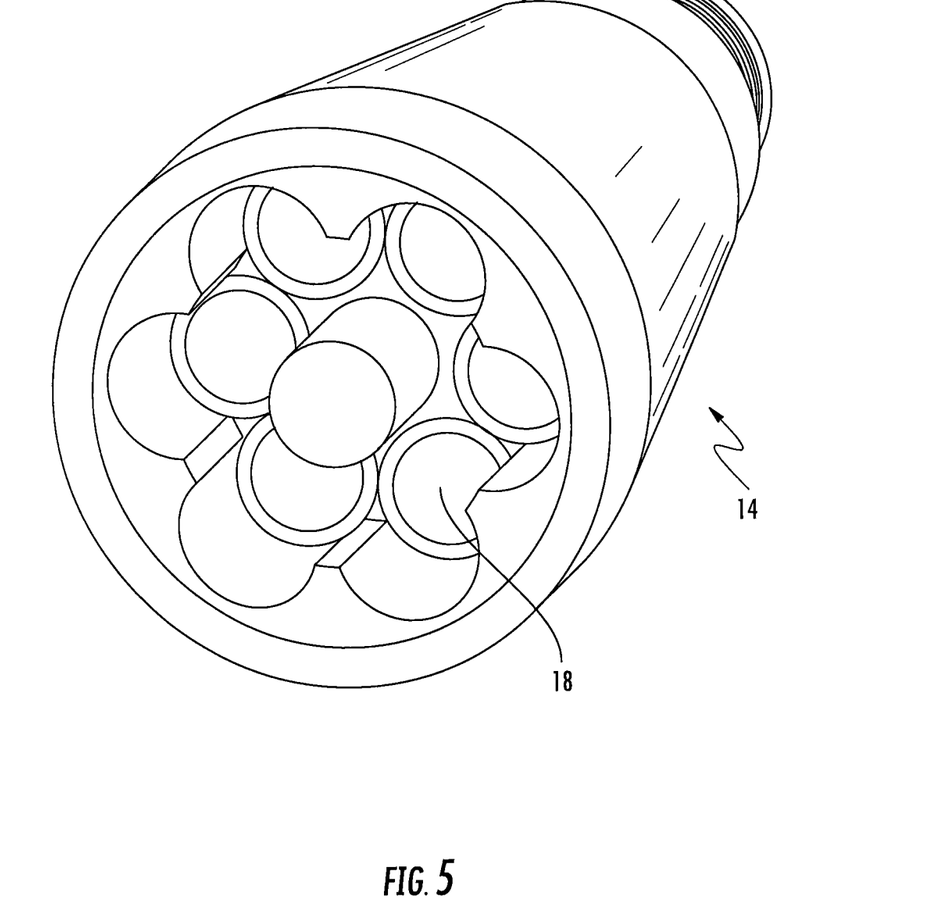
FIG. 5 is an end perspective view of the wide end of the housing of FIG. 2.

Referring now to the drawings, a transition assembly, designated broadly at 10, is shown in FIG. 1. The transition assembly 10 includes a trunk cable 12, typically a fiber optic cable, that enters one end of a conical transition housing 14, and optical fibers 13 housed within furcation tubes 42 that exit the opposite end of the housing 14. These components are described in greater detail below.

Referring now to FIGS. 2-5, the housing 14 is generally conical in shape. At its narrow end the housing 14 includes a threaded or ribbed neck 16 with a plurality of bores 18. Each of the bores 18 extends through the length of the housing 14 (see FIGS. 3-5). The housing 14 also includes a shoulder 20 adjacent the neck 16 that is slightly larger than the neck 16. The housing 14 is typically formed of a polymeric material, such as polycarbonate or PBT (filled or unfilled), or a metallic material such as aluminum, and may be fashioned via molding or machining.

Figure 6:
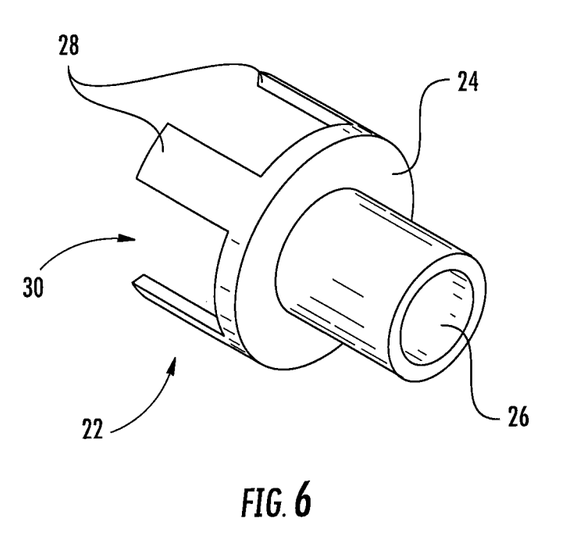
FIG. 6 is a perspective view of the spacer of the assembly of FIG. 1.

Referring now to FIG. 6, a spacer 22 is positioned adjacent the free end of the neck 16. The spacer 22 has a circular base 24, a circular through boss 26 that extends from one side of the base 24, and four legs 28 that extend from the opposite side of the base 24 that form gaps 30. The spacer 22 is typically formed of a polymeric material, such as polycarbonate or PBT (filled or unfilled), or a metallic material such as aluminum.

Figure 7:
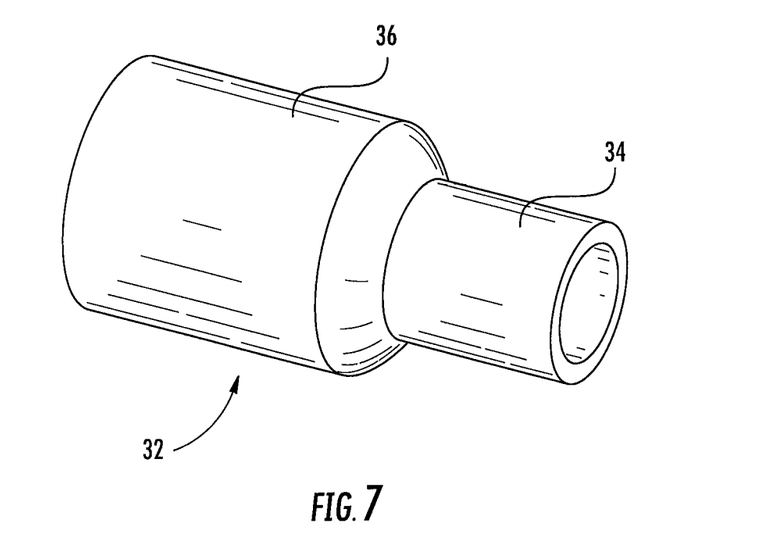
FIG. 7 is a perspective view of the crimp ferrule of the assembly of FIG. 1.
Figure 8:
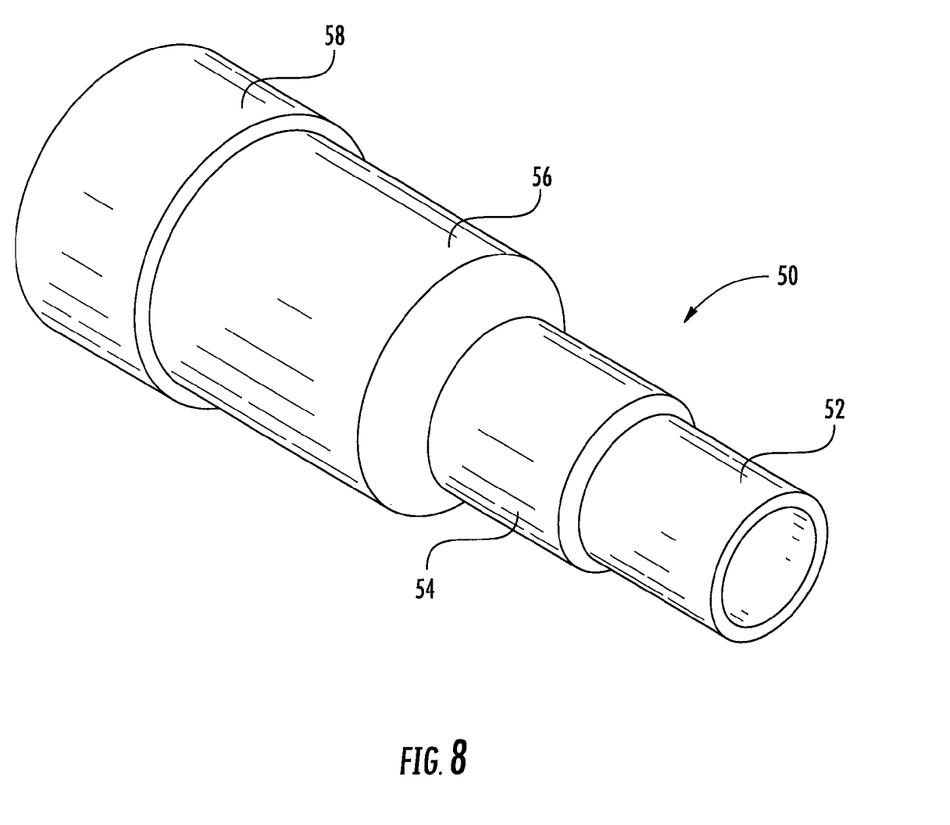
FIG. 8 is a perspective view of the heat shrink tube of the assembly of FIG. 1.

Referring now to FIG. 7, a crimp ferrule 32 includes a narrow ring 34 and a wide ring 36. A heat shrink tube 50 (see FIG. 8) is generally cylindrical, but has a gradually stepped profile, such that it has a narrow end 52, two intermediate sections 54, 56, and a wide end 58. The heat shrink tube 50 is typically formed of a heat-shrinkable material, such as a polyolefin (optionally with an adhesive).

Figure 9:
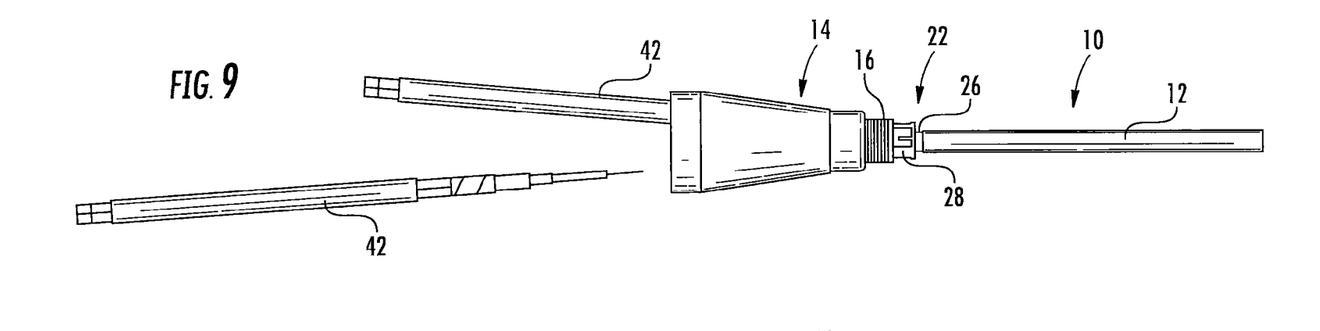
FIG. 9 is a side view of the housing of FIG. 2 and the spacer of FIG. 6 during assembly of the assembly of FIG. 1 with a fiber optic trunk cable.
Figure 10:
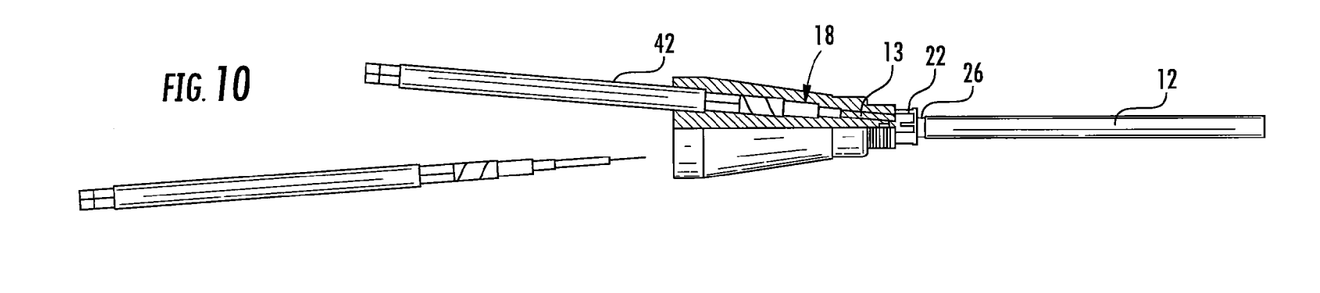
FIG. 10 is a side section view of the housing and spacer of FIG. 9.

During construction of the assembly 10, the crimp ferrule 32 and heat shrink tube 58 are slipped onto the trunk cable 12. The optical fibers 13 of the cable 12 are routed through the boss 26 and gaps 30 of the spacer 22 and into the bores 18 of the housing 14. One or more optical fibers 13 from the trunk cable 12 are then threaded into each furcation tube 42. The furcation tubes 42 are the inserted into the ends of the bores 18 adjacent the wider end of the housing 14 such that the optical fibers 13 "pass through" the housing 14 as they are routed from the cable 12 to the furcation tubes 42 (see FIG. 10). The housing 14 is positioned adjacent the spacer 22 such that the ends of the legs 28 of the spacer 22 abut the free end of the neck 16 of the housing 14 (see FIG. 9). The legs 28 of the spacer 22 are of sufficient length that the optical fibers 13 can be routed into the bores 18 of the housing 14 without undue bending. In some embodiments, the legs 28 provide an axial gap of at least 15-20 mm to protect the optical fibers, although this may vary; ideally the optical fibers undergo a bend of less than about 30 degrees.

Figure 11:
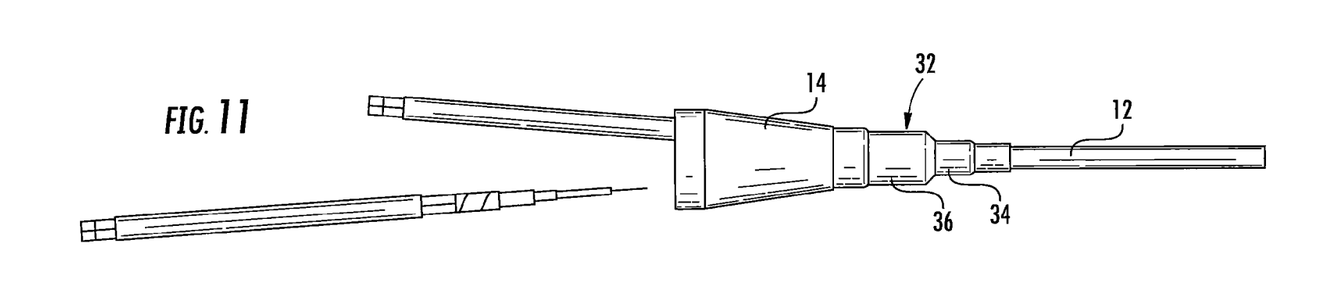
FIG. 11 is a side view of the housing of FIG. 2 and the crimp ferrule of FIG. 7 during assembly of the assembly of FIG. 1.

As shown in FIG. 11, the crimp ferrule 32 is then slipped over the spacer 22, with the narrow ring 34 surrounding the end of the jacket of the cable 12 and the wide ring 36 fitting over the spacer 22 and the neck 16 of the housing 14. The crimp ferrule 32 can then be secured in place via crimping of the narrow ring 34 and the wide ring 36 to their respective underlying components. The crimp ferrule 32 can provide strain relief for the optical fibers 13.

Referring now to FIG. 1, the heat shrink tube 50 can then be slipped over the crimp ferrule 32 and the shoulder 20 of the housing 12, with the narrow end 52 overlying a portion of the jacket of the cable 12, the intermediate sections 54, 56 overlying the narrow and wide rings 34, 36 of the crimp ferrule 32, and the wide end 58 overlying the shoulder 20 of the housing 14. Once in place, the heat shrink tube 50 is heated; the heating process shrinks the heat shrink tube 50 over these underlying structures. Thus, together the heat shrink tube 50 and the crimp ferrule 32 provide a protective cover 60 for the assembly 10.

Those of skill in this art will appreciate that the assembly 10 may take alternative forms. For example, the housing 14 may be shaped differently (e.g., it may be cylindrical or rectangular), and/or may have different numbers of bores. The housing 14 may be formed by molding as described above, or may be overmolded as a monolithic structure over the cable 12 and furcation tubes 42. The bores 18 may be routed between to and/or from different sides of the housing 14 rather than to and from the ends. The crimp ferrule 32 and/or the heat shrink tube 58 may be configured differently or omitted from the cover 60. The furcation tubes 42 may be armored. In some embodiments, the cable 12 may be a hybrid power/fiber cable rather than a fiber optic cable. Other variations may also be suitable.

The foregoing is illustrative of the present invention and is not to be construed as limiting thereof. Although exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. The invention is defined by the following claims, with equivalents of the claims to be included therein.

That which is claimed is:

1. A cable distribution assembly, comprising:
   a housing having a first side and a second side,
   wherein a plurality of bores extend through the housing from the first side to the second side;
   a plurality of furcation tubes inserted into the bores at the second side of the housing;
   a trunk cable comprising a jacket and a plurality of optical fibers,
   wherein one or more of the optical fibers are threaded through the bores and into the furcation tubes;
   a spacer adjacent the first side of the housing and the cable jacket,
   the spacer including a plurality of legs that contact the first side of the housing and a boss that receives optical fibers from the trunk cable as the optical fibers are routed into the housing;
   the spacer creating space in which the optical fibers are routed from the trunk cable to the bores at the first side of the housing; and a cover that covers the spacer and at least partially covers the trunk cable and the first side of the housing.

2. The assembly defined in claim 1, wherein the cover comprises a ferrule and a heat-shrink sheath that overlies the ferrule.

3. The assembly defined in claim 2, wherein the ferrule is a crimp ferrule.

4. The assembly defined in claim 1, wherein the housing is generally conical, with a narrower first side and a wider second side.

5. The assembly defined in claim 3, wherein the first side of the housing includes a neck, and wherein the cover overlies the neck.

6. The assembly defined in claim 1, wherein the housing comprises a monolithic structure with the bores formed therein.

7. The assembly defined in claim 1, wherein the furcation tubes are armored furcation tubes.

8. The assembly defined in claim 1, wherein the trunk cable is a fiber optic cable.

9. The assembly defined in claim 1, wherein the spacer creates an axial gap of at least 15 mm for optical fiber routing.

10. A cable distribution assembly, comprising:
a housing having a first side and a second side, wherein a plurality of bores extend through the housing from the first side to the second side;
a plurality of armored furcation tubes inserted into the bores at the second side of the housing;
a trunk cable comprising a jacket and a plurality of optical fibers,
wherein one or more of the optical fibers are threaded through the bores and into the furcation tubes;
a spacer adjacent the first side of the housing and the cable jacket,
the spacer including a plurality of legs that contact the first side of the housing and a boss that receives optical fibers from the trunk cable as the optical fibers are routed into the housing;
the spacer creating space in which the optical fibers are routed from the trunk cable to the bores at the first side of the housing; and
a cover that covers the spacer and at least partially covers the trunk cable and the first side of the housing,
wherein in the cover comprises a ferrule and a heat-shrink tube overlying the ferrule.

11. The assembly defined in claim 10, wherein the ferrule is a crimp ferrule.

12. The assembly defined in claim 10, wherein the housing is generally conical, with a narrower first side and a wider second side.

13. The assembly defined in claim 12, wherein the first side of the housing includes a neck, and wherein the cover overlies the neck.

14. The assembly defined in claim 10, wherein the housing comprises a monolithic structure with the bores formed therein.

15. The assembly defined in claim 10, wherein the trunk cable is a fiber optic cable.

16. The assembly defined in claim 10, wherein the spacer creates an axial gap of at least 15 mm for optical fiber routing.

17. A method of forming a cable distribution, comprising the steps of:
(a) inserting a plurality of optical fibers of a trunk cable through a spacer, the spacer including a plurality of legs that contact the first side of the housing and a boss that receives optical fibers from the trunk cable as the optical fibers are routed into the housing;
(b) inserting the plurality of optical fibers into bores in a first side of a housing;
(c) inserting the plurality of optical fibers into a plurality of furcation tubes;
(d) inserting the plurality of furcation tubes into the bores in a second side of the housing;
(e) positioning the spacer adjacent the first side of the housing; and
(f) applying a cover that at least partially covers the cable and the housing and covers the spacer.

18. The method defined in claim 17, wherein the cover comprises a crimp ferrule and a heat-shrink tube.

* * * * *